United States Patent
Temma

[11] Patent Number: 5,966,511
[45] Date of Patent: Oct. 12, 1999

[54] SYSTEM FOR MONITORING STATES OF COMPONENTS OF SAME KIND INCORPORATED INTO INFORMATION PROCESSING APPARATUS

[75] Inventor: Shoji Temma, Kawasaki, Japan

[73] Assignee: Fujitsu Limited, Kawasaki, Japan

[21] Appl. No.: 08/953,680

[22] Filed: Oct. 17, 1997

Related U.S. Application Data

[63] Continuation of application No. 08/521,423, Aug. 30, 1995, abandoned.

[30] Foreign Application Priority Data

Feb. 24, 1995 [JP] Japan .................................. 7-036451

[51] Int. Cl.$^6$ .................................................. G06F 11/00
[52] U.S. Cl. .............................. 395/184.01; 395/182.04; 340/853.2; 364/264
[58] Field of Search ........................ 395/184.01, 182.04, 395/182.09, 182.2, 183.15; 364/265, 268.3, 268.8, 221.7, 264; 340/853.2; 318/568.24

[56] References Cited

U.S. PATENT DOCUMENTS

| | | | |
|---|---|---|---|
| 3,641,539 | 2/1972 | Lesher ..................................... | 371/15.1 |
| 4,025,767 | 5/1977 | Bottard ................................... | 371/15.1 |
| 4,153,945 | 5/1979 | Actor et al. ............................. | 364/900 |
| 4,456,951 | 6/1984 | Henneberger et al. ................. | 364/200 |
| 4,456,994 | 6/1984 | Segarra .................................... | 371/16 |
| 4,527,270 | 7/1985 | Sweeton .................................. | 371/11 |
| 4,635,258 | 1/1987 | Salowe .................................... | 371/16.1 |
| 4,639,889 | 1/1987 | Matsumoto et al. .................... | 364/900 |
| 4,799,159 | 1/1989 | Davidson et al. ....................... | 371/68 |
| 4,835,671 | 5/1989 | Sato et al. ............................... | 364/186 |
| 5,029,168 | 7/1991 | Chan ....................................... | 371/16.1 |
| 5,084,875 | 1/1992 | Weinberger et al. ................... | 371/29.1 |
| 5,095,365 | 3/1992 | Takatoo et al. ......................... | 358/108 |
| 5,189,674 | 2/1993 | Shimizu .................................. | 371/20.1 |
| 5,297,256 | 3/1994 | Wolstenholme et al. ............... | 395/575 |
| 5,361,265 | 11/1994 | Weinberger et al. .................. | 371/29.1 |
| 5,432,715 | 7/1995 | Shigematsu et al. ................... | 364/551.01 |
| 5,437,046 | 7/1995 | Bright et al. ............................ | 395/800 |
| 5,450,440 | 9/1995 | Nishihara et al. ...................... | 375/224 |
| 5,452,443 | 9/1995 | Oyamada et al. ...................... | 395/182.08 |
| 5,487,148 | 1/1996 | Komori et al. ......................... | 395/182.02 |
| 5,487,149 | 1/1996 | Sung ....................................... | 395/182.08 |

Primary Examiner—Dieu-Minh Le
Attorney, Agent, or Firm—Staas & Halsey

[57] ABSTRACT

The state monitoring system includes a plurality of objects of monitor of the same kind, a monitor unit for monitoring the plurality of objects of monitor to determine if any of them malfunctions, and a consolidating unit interposed between the plurality of objects of monitor and the monitor unit. The consolidating unit consolidates alarm signals sent from the objects of monitor for each group of objects of monitor. When detecting, on the basis of the result of consolidation, that one of each group of objects of monitor has malfunctioned, the consolidating unit notifies an associated monitor unit of the occurrence of one fault. When detecting that two or more objects of monitor have malfunctioned, the consolidating unit notifies the associated monitor unit of the occurrence of a plurality of faults. Each monitor unit is interconnected via a communicator thereof, and judges the states of objects of monitor by mutually transferring monitor data concerning its own system and monitor data concerning the other system. Owing to this configuration, the number of signal lines for use in notifying occurrence of malfunction to a monitor unit can be reduced. This leads to easy judgment of an abnormal state. A change in the number of objects of monitor can be coped with flexibly without the need of modifying the design of each monitor unit.

11 Claims, 7 Drawing Sheets

Fig. 4

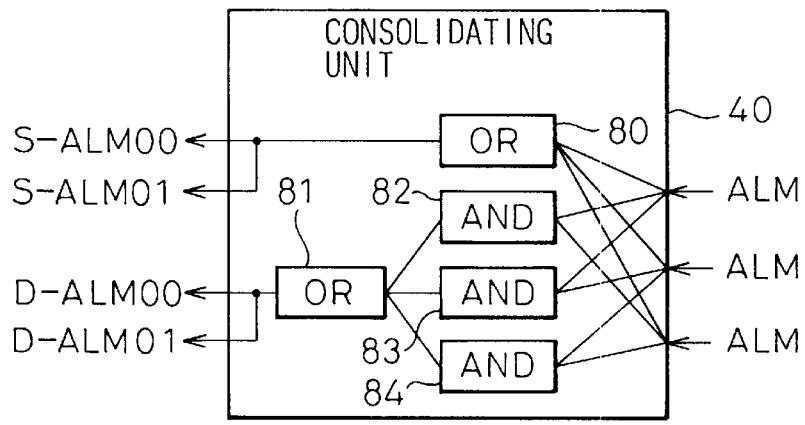

Fig. 5

| MONITOR DATA | | | | | | JUDGMENT |
|---|---|---|---|---|---|---|
| MONITOR UNIT (#0) | | MONITOR UNIT (#1) | | LOGICAL SUM | | |
| S-ALM00 | D-ALM00 | S-ALM01 | D-ALM01 | S-ALMO | D-ALMO | |
| OFF | OFF | OFF | OFF | OFF | OFF | ALL NORMAL |
| ON | OFF | OFF | OFF | ON | OFF | OCCURRENCE OF SINGLE FAULT |
| OFF | OFF | ON | OFF | | | |
| ON | OFF | ON | OFF | | | |
| OFF | OFF | OFF | ON | — | ON | OCCURRENCE OF PLURAL FAULTS |
| OFF | ON | OFF | OFF | | | |
| OFF | ON | OFF | ON | | | |
| OFF | OFF | ON | ON | | | |
| OFF | ON | ON | OFF | | | |
| OFF | ON | ON | ON | | | |
| ON | OFF | OFF | ON | | | |
| ON | OFF | ON | ON | | | |
| ON | ON | OFF | OFF | | | |
| ON | ON | OFF | ON | | | |
| ON | ON | ON | OFF | | | |
| ON | ON | ON | ON | | | |

Fig. 6

| JUDGMENT OF MONITOR UNIT | | PROCESSINGS |
|---|---|---|
| GROUP OF OBJECTS OF MONITOR (#0) | GROUP OF OBJECTS OF MONITOR (#1) | |
| NORMAL | NORMAL | KEEP THE EXISTING STATE |
| | OCCURRENCE OF SINGLE FAULT | CONTROL FAN TO ROTATE AT HIGH SPEED |
| | OCCURRENCE OF PLURAL FAULTS | CUT OFF POWER SUPPLY TO MONITOR UNIT |
| OCCURRENCE OF SINGLE FAULT | NORMAL | CONTROL FAN TO ROTATE AT HIGH SPEED |
| | OCCURRENCE OF SINGLE FAULT | |
| | OCCURRENCE OF PLURAL FAULTS | CUT OFF POWER SUPPLY TO MONITOR UNIT |
| OCCURRENCE OF PLURAL FAULTS | NORMAL | |
| | OCCURRENCE OF SINGLE FAULT | |
| | OCCURRENCE OF PLURAL FAULTS | |

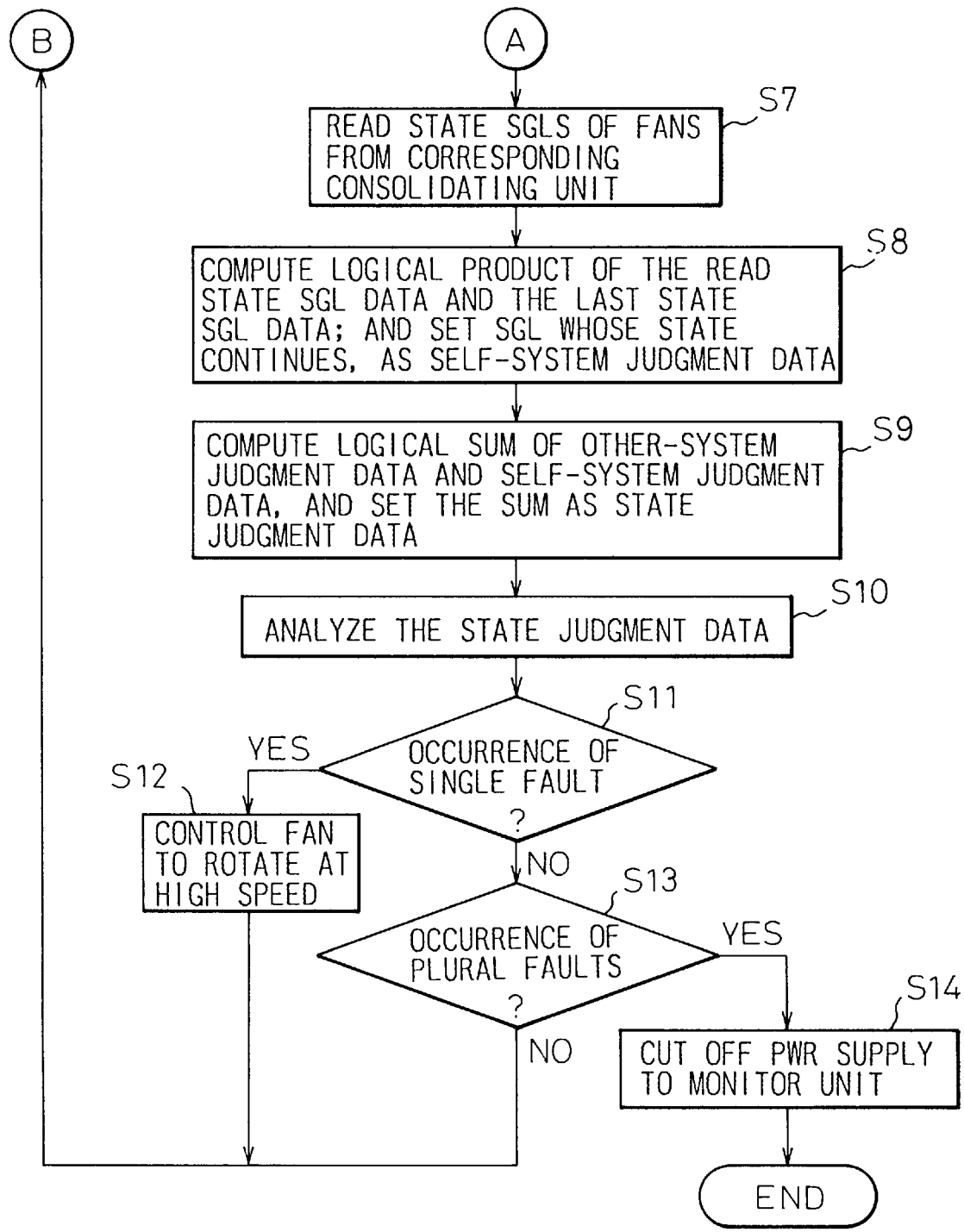

SYSTEM FOR MONITORING STATES OF COMPONENTS OF SAME KIND INCORPORATED INTO INFORMATION PROCESSING APPARATUS

This application is a continuation, of application Ser. No. 08/521,423, filed Aug. 30, 1995, now abandoned.

BACKGROUND OF THE INVENTION

1. Field of the Invention

The present invention relates to an information processing system and, more particularly, to an art for monitoring a plurality of components of the same kind (for example, power source units, air cooling fans, and temperature sensors), which are incorporated in an information processing apparatus, to determine if any of the components have malfunctioned.

A plurality of the foregoing components are mounted in an information processing system or the like. In particular, insofar as a system is required to be fault-tolerant is concerned, redundant components are incorporated. A monitor unit for monitoring the components to determine that they are functioning normally is often duplicated. There is a growing demand for an art making it possible to construct such a monitoring system readily and flexibly.

2. Description of the Related Art

FIG. 1 shows the configuration of a prior art state monitoring system. In FIG. 1, reference numerals 90 and 91 denote monitor units. 92 to 96 denote objects to be monitored, such as power source units and fans.

In a known state monitoring system, when a malfunction is detected, each of the objects to be monitored 92 to 96 issues an alarm signal ALM to notify the monitor units 90 and 91 of occurrence of a malfunction. Signal lines linking the objects of monitor 92 to 96 and the monitor units 90 and 91 and each carrying (i.e., conducting) the alarm signal ALM are laid down on a one-to-one basis. In the example of FIG. 1, ten alarm signal ALM lines are laid down.

The monitor units 90 and 91 monitor the objects of monitor 92 to 96 to see if any of the objects transmits the alarm signal ALM. Based on the alarm signal ALM, the occurrence of one fault (a fault occurs in one object of monitor) or the occurrence of a plurality of faults (a fault occurs in each of a plurality of objects of monitor) is detected. The two monitor units 90 and 91 are incorporated, so that in case one of the monitor units 90 and 91 fails, the objects of monitor can be continuously monitored for a malfunction by the other without the need of stopping the state monitoring system.

As shown in FIG. 1, according to the known system configuration in which two monitor units are incorporated, the signal lines for the alarm signal ALM link the objects of monitor 92 to 96 and the monitor units 90 and 91 on a one-to-one basis. Compared with the incorporation of one monitor unit, twice as many signal lines are needed. This results in complex wiring.

For analyzing a faulty state, it is necessary to produce information representing a definition of the patterns of states of signal lines. Each monitor unit is therefore required to carry out complex analyses.

Furthermore, when the number of objects of monitor is changed, for example, when a system is expanded, reconstruction of monitor units becomes necessary. This means that a change in system configuration cannot be coped with flexibly.

SUMMARY OF THE INVENTION

An object of the present invention is to reduce the number of signal lines for use in notifying a monitor unit of an occurrence of a malfunction, simplifying judgment of an abnormal state, and provide a state monitoring system capable of flexibly coping with a change in the number of objects of monitor without the need of modifying the design of the monitor unit.

According to the present invention, there is provided a state monitoring system comprising: a plurality of objects of monitoring of the same kind; a monitor unit for monitoring the plurality of objects of monitoring to determine if any of the objects of monitoring have malfunctioned; and a consolidating unit interposed between the plurality of objects of monitoring and the monitor unit for consolidating notifications of malfunctions sent from the objects of monitoring, the consolidating unit including a unit which, when receiving at least one notification of malfunction from the plurality of objects of monitoring, notifies the monitor unit of an abnormal state of an object of monitor, using a given number of kinds of fault occurrence notification signals, which is smaller than the number of the objects of monitoring and is determined according to the number of the notifications of malfunction.

BRIEF DESCRIPTION OF THE DRAWINGS

Other objects and features of the present invention will be described hereinafter, in detail, by way of preferred embodiments with reference to the accompanying drawings, in which:

FIG. 4 is a diagram showing an example of the configuration of a consolidating unit;

FIG. 5 is an explanatory diagram concerning state judgments to be made by a state judging unit in a monitor unit;

FIG. 6 is an explanatory diagram concerning processing executed by a monitor unit; and FIGS. 7a and 7b are flowcharts representing the processing executed by the monitor unit.

DESCRIPTION OF THE PREFERRED EMBODIMENTS

Figure 1:
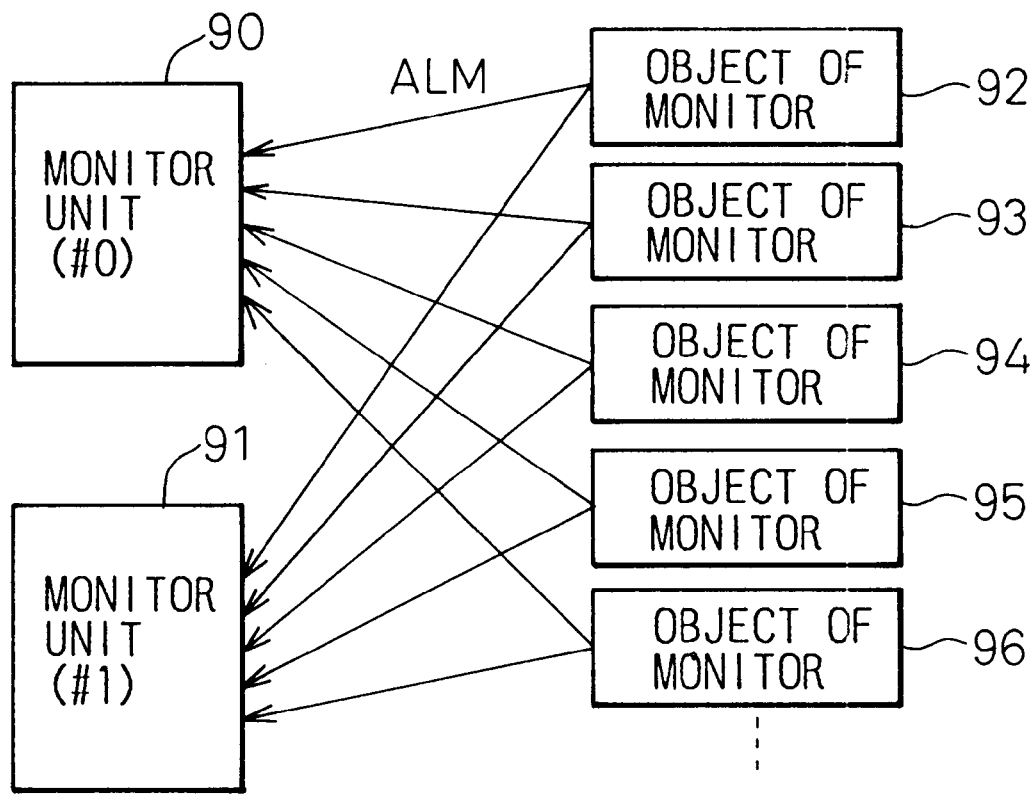
FIG. 1 is a block diagram showing the configuration of a state monitoring system in accordance with a prior art.
Figure 2A:
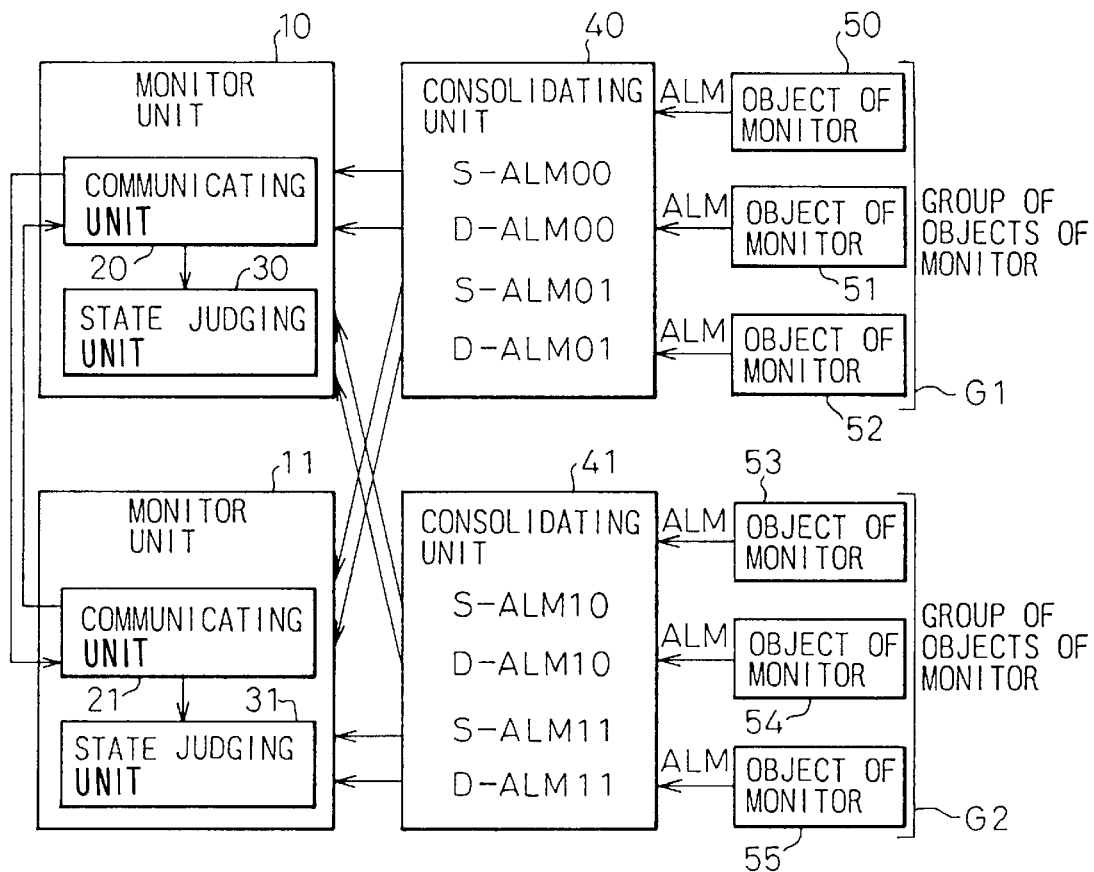
FIGS. 2a and 2b are block diagrams showing the principle and configuration of a state monitoring system in accordance with the present invention.
Figure 2B:
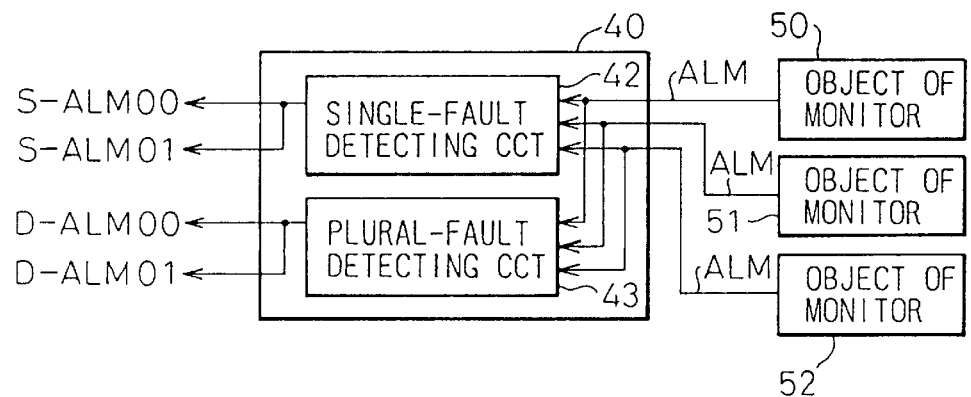

FIGS. 2a and 2b show examples of the principle and configuration of a state monitoring system in accordance with the present invention.

Objects of monitor 50 to 55 are equipment to be monitored such as power source units and fans incorporated in a system, and which are divided into several groups of objects of monitor G1 and G2. When the objects of monitor 50 to 55 constitute multiple objects of monitor, the number of groups "G" of objects of monitor (i.e. in excess of) G1 and G2) is determined according to the number of the multiple objects of monitor.

Consolidating units 40 and 41 consolidate alarm signals ALM sent from the objects of monitor 50 to 52 and 53 to 55, belonging to the respective groups of objects of monitor G1 and G2, and notify the monitor units 10 and 11 of an occurrence of a malfunction. For example, the consolidating unit 40 has, as shown in FIG. 2b, a single-fault detecting circuit 42 and a plural-fault detecting circuit 43 and receives an alarm signal ALM from each of the objects of monitor 50 to 52. When the occurrence of one fault is detected on the basis of a received alarm signal ALM, the single-fault detecting circuit 42 notifies the monitor unit 10 of occurrence of the single fault by transmitting a single-fault occurrence notification signal S-ALM00 and also notifies the monitor unit 11 of the occurrence of the single fault by transmitting a single-fault occurrence notification signal S-ALM01. When the occurrence of two or more faults is detected, the plural-fault detecting circuit 43 notifies the monitor unit 10 of the occurrence of a plurality of faults by transmitting a plural-fault occurrence notification signal D-ALM00 and also notifies the monitor unit 11 of occurrence of a plurality of faults by transmitting a plural-fault occurrence notification signal D-ALM01. The same applies to the consolidating unit 41.

Monitor units 10 and 11 receive the single-fault occurrence notification signals S-ALM00, S-ALM10, S-ALM01, and S-ALM11, and the plural-fault occurrence notification signals D-ALM00, D-ALM10, D-ALM01, and D-ALM11, and judge on the basis of the received signals (that is, monitor data) if the system is operating normally or abnormally.

Communicating units 20 and 21 have the ability to facilitate mutual transfer of monitor data between the monitor units 10 and 11. Each of the monitor units 10 and 11 transfers monitor data to the other monitor unit at given intervals via each of the communicating units 20 and 21. Each of state judging units 30 and 31 in the monitor units 10 and 11 judges on the basis of the logical sum of monitor data existent in its own monitor unit and monitor data sent from the other monitor unit if any of the objects of monitor 50 to 55 have malfunctioned. Depending on the degree of the malfunction, if necessary, the controlled states of the objects of monitor 50 to 55 are changed or the system is stopped.

The consolidating units 40 and 41 monitor data represented by alarm signals ALM sent from the objects of monitor 50 to 55, and consolidate the data so as to produce signals S-ALMxx for notifying the occurrence of one fault in associated groups of objects of monitor ("group consolidated single fault notification signal") and signals D-ALMxx for notifying the occurrence of two or more faults ("group consolidated plural fault notification signal").

When the objects of monitor 50 to 55 constitute multiple objects of monitor, the consolidating units 40 and 41 are provided in a one-to-one relationship to the multiple objects of monitor. Each monitor unit 10, 11 and each consolidating unit 40, 41 are linked with respective set of signal lines for the single-fault occurrence notification signals S-ALMxx and for the plural-fault occurrence notification signals D-ALMxx.

Since the monitor units are provided in a duplicate, or redundant, constitution in the example of FIG. 2a, the monitor units 10 and 11 are each connected to both of the consolidating units 40 and 41, respectively. The communicating units 20 and 21, each of which transmits information (that is, monitor data represented by fault occurrence notification signals produced by the consolidating units 40 and 41) representing the states of the objects of monitor 50 to 55 identified by the monitor units 10 and 11 to the monitor unit of the other system, are interposed between the monitor units 10 and 11. Owing to this configuration, the monitor units 10 and 11 notify each other of their own identified states at given intervals so that they can refer to the monitor data of each other.

As mentioned above, according to the present invention, the number of signal lines for use in notifying the monitor units 10 and 11 of an occurrence of a malfunction can be reduced owing to the actions (consolidating malfunction information, and notifying occurrence of a malfunction to the monitor units 10 and 11) of the consolidating units 40 and 41 interposed between the objects of monitor 50 to 55 and monitor units 10 and 11. The consolidating units 40 and 41 consolidate information representing malfunctions to be monitored. Even when the number of objects of monitor is increased due to system expansion or the like, the hardware of the monitor units need not be modified but the increase can be coped with flexibly.

Figure 3A:
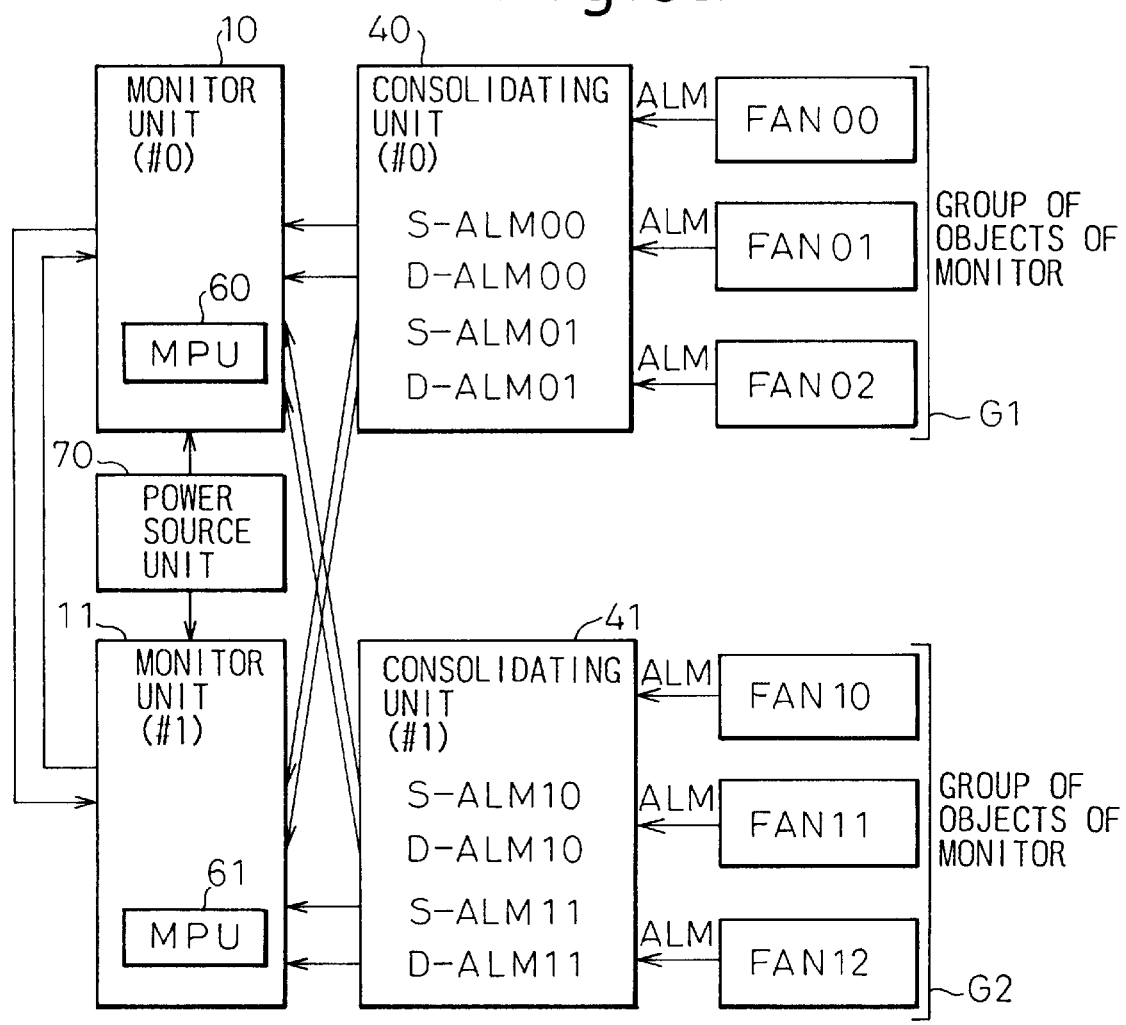
FIGS. 3a and 3b are block diagrams showing the configuration of a state monitoring system in accordance with an embodiment of the present invention.
Figure 3B:
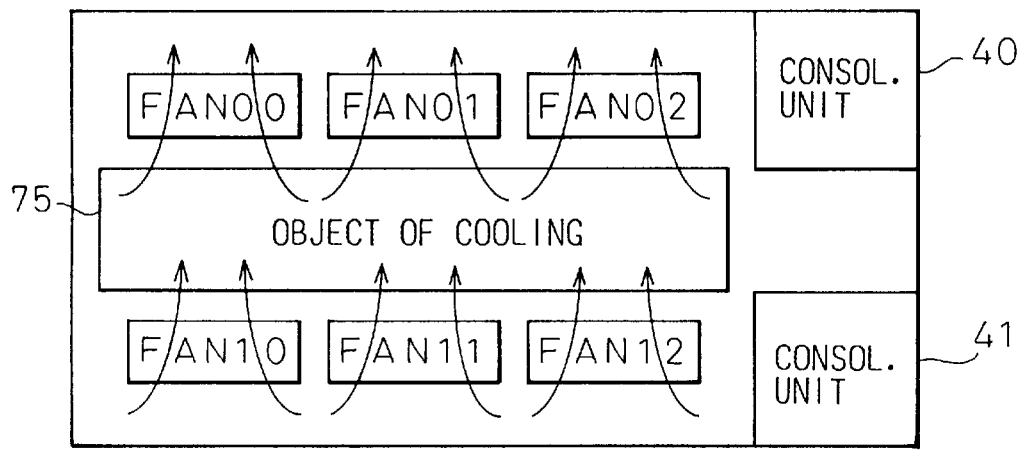

FIGS. 3a and 3b show the configuration of a state monitoring system in accordance with an embodiment of the present invention. The present invention is adapted for monitoring a power source unit and cooling fan units in a system.

A system shown in FIG. 3a uses monitor units 10 and 11, one of which is a duplicate to the other, to monitor a power source unit 70 and six fans FAN00 to FAN12. The fans FAN00 to FAN12 are arranged as shown in FIG. 3b relative to, for example, an object of cooling 75 such as information processing equipment. The fans FAN00 to FAN12 are rotated in order to blow air, thus cooling the object of cooling 75. Assuming that two or more of the fans FAN00 to FAN02 and two or more of the fans FAN10 to FAN12 are normal, the amount of air flow required for cooling the object of cooling 75 is supplied. That is to say, this system adopts a redundant configuration in which one extra fan is mounted relative to two requisite fans in an effort to guarantee satisfactory cooling capacity even if one of three fans fails.

The group of objects of monitor G1 is composed of the fans FAN00 to FAN02. The group of objects of monitor G2 is composed of the fans FAN10 to FAN12. The consolidating units 40 and 41 are mounted in a one-to-one relationship with the groups of objects of monitor G1 and G2.

In the group of objects of monitor G1 or G2, if all the respective fans FAN00 to FAN02 and FAN10 to FAN12 are normal, the amount of air supplied exceeds the required amount of air. During normal operation, the fans are therefore rotated at low speeds. If any of the fans malfunctions, the remaining normal fans are rotated at high speed. Since each of the groups of objects of monitor G1 and G2 has only one extra fan, when two or more fans fail, the amount of cooling air becomes insufficient. If two or more fans fail, the power supply must be cut off in order to stop the system for fear the system should run abnormally due to heating and cause a serious fault.

The monitor units 10 and 11 have microprocessor units (MPU) 60 and 61, and monitor the single-fault occurrence notification signals S-ALM00 and the S-ALM01 and plural-fault occurrence notification signals D-ALM00 D-ALM01 when sent from the consolidating unit 40. The monitor units 10 and 11 also monitor the single-fault occurrence notification signals S-ALM10 and S-ALM11 and plural-fault occurrence notification signals D-ALM10 D-ALM11 when sent from the consolidating unit 41. The monitor units 10 and 11 are interconnected via a communicating unit 100 shaped like a back panel, and transfer monitor data at given intervals.

FIG. 4 shows an example of the configuration of a consolidating unit 40. In the example of FIG. 4, the internal components of the consolidating unit 40 are illustrated. In FIG. 4, reference numerals 80 and 81 denote OR circuits and 82 to 84 denote AND circuits.

Each of the alarm signals ALM sent from the fans represents a logical 0 for normal operation and a logical 1 for abnormal operation. The alarm signals ALM sent from the fans are fed to the OR circuit 80. If any of the alarm signals ALM represents a 1, the single-fault occurrence notification signals S-ALM00 and S-ALM01 represent logical 1's (meaning occurrence of one fault). In this example, when one or more fans malfunctions, the single-fault occurrence notification signals S-ALM00 and S-ALM01 represent logical 1's. It is easy to arrange that if two or more fans malfunction, single-fault occurrence notification signals S-ALM00 and S-ALM01 represent logical 0's.

Pairs of the three alarm signals ALM sent from three fans are fed to the AND circuits 82 to 84 and the outputs of the AND circuits 82 to 84 are fed to the OR circuit 81, whereby plural-fault occurrence notification signals D-ALM00 and D-ALM01 for notifying the occurrence of two or more faults are produced.

FIG. 5 is an explanatory diagram concerning state judgments made by the state judging units 30 and 31. For brevity's sake, state judgments concerning the group of objects of monitor Gi will be described. The same description also applies to the group of objects of monitor G2.

The monitor unit 10 monitors the single-fault occurrence notification signal S-ALM00 and the plural-fault occurrence notification signal D-ALM00 when sent from the consolidating unit 40. The monitor unit 11 monitors the single-fault occurrence notification signal S-ALM01 and the plural-fault occurrence notification signal D-ALM01 when sent from the consolidating unit 40. These monitor data are transferred between the monitor units 10 and 11 via the communicating units 20 and 21. Each of the monitor units 10 and 11 calculates the OR of its own monitor data the and monitor data sent from the other, such unit.

As a result, if the signal S-ALM0 expressing the OR of the signals S-ALM00 and S-ALM01 indicates an off state (represents a 0) and the signal D-ALM0 expressing the OR of the signals D-ALM00 and D-ALM01 indicates an off state (represents a 0), it is judged that all the fans are normal.

If the signal S-ALM0 expressing the OR indicates an on state (represents a 1) and the signal D-ALM0 indicates an off state (represents a 0), it is judged that one fan belonging to the group of objects of monitor G1 has failed.

If the signal D-ALM0 expressing the OR indicates an on state (represents a 1), it is judged that two or more fans belonging to the group of objects of monitor G1 fail. At this time, whether the signal S-ALM0 indicates an off or on state is not taken into consideration for the judgment.

Even if the monitor units 10 and 11 are successfully acquiring state information concerning the groups of objects of monitor G1 and G2, the monitor units 10 and 11 mutually transfer data via the respective communicating units. This is intended to prevent the monitor units 10 and 11 from making inconsistent judgments when an interface between each pair of the consolidating units 40 and 41 and the monitor units 10 and 11 malfunctions for some reason. Monitor data is therefore transferred between the monitor units 10 and 11, so that the monitor units can share their own monitor data and the monitor data concerning the other system, consistent with the above-noted redundancy, or duplication. Thus, the two monitor units 10 and 11 will never operate inconsistently.

FIG. 6 is an explanatory diagram concerning processing performed by a monitor unit.

The monitor units 10 and 11 execute the processing described below according to the result of state judgment based on the table shown in FIG. 5 indicating that the group of objects of monitor (#0) G1 or group of objects of monitor (#1) G2 is normal, has one fault, or has two or more faults.

If both the group of objects of monitor #0 and the group of objects of monitor #1 are normal, all the fans are normal. The monitor units 10 and 11 do nothing and retain the current situation.

If one of the group of objects of monitor #0 and the group of objects of monitor #1 has one fault and the other one thereof is normal, or if both of them have one fault, the other normal fans are controlled and rotated at high speed in order to compensate for the degradation of cooling capacity stemming from the fault(s).

If one of the group of objects of monitor #0 and the group of objects of monitor #1 (i.e., both thereof) have two or more faults, even when the remaining fans are rotated at high speeds, the amount of cooling air is insufficient. The power supply of the system is therefore cut off, thus preventing occurrence of a serious fault.

Figure 7A:
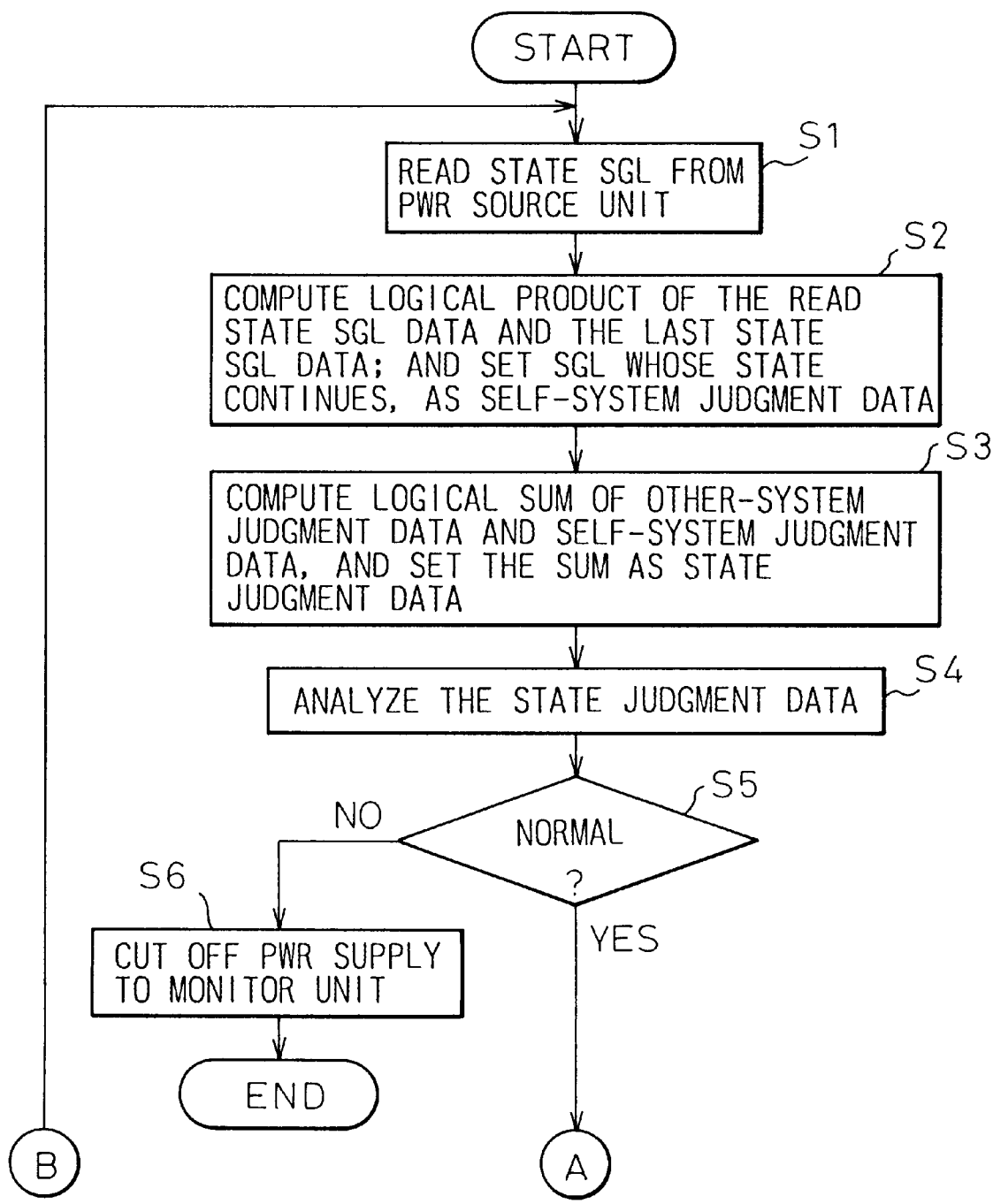

FIGS. 7a and 7b, in the composite are a flowchart representing the processing to be executed by each of the monitor units in the embodiment of the present invention. The monitor units execute the sequence below using the MPUs 60 and 61 shown in FIG. 3a.

First, at step S1, a state signal concerning the power source unit 70 is read. At step S2, the AND of a previous state signal data and a current state signal data is calculated, and a signal expressing a continuous state is specified as own-system, or self-system, judgment data. The state signal concerning the power source unit represents a logical 0 for normal operation and a logical 1 for abnormal operation. Whether a state is continuous can therefore be judged on the basis of the AND of the state signals. When previous read data represents a logical 0 and current read data represents a logical 0, the AND of the data is a logical 0. The power source unit is therefore considered to be normal. When previous and current read data shows a transition from a logical 0 to 1 or from a logical 1 to 0, no state is stable. In this case, the AND of signals is regarded as a logical 0, and the development of the situation is watched. This is intended to prevent incorrect judgment of a state in case a signal fluctuates temporarily because of noise or the like. When previous read data represents a logical 1 and current read data represents a logical 1, the AND of the data is a logical 1. This means that the abnormal state is continuous. The AND data is reflected on the own-system judgment data. The own-system judgment data is transmitted to the monitor unit of the other system by means of the communicating means.

At step S3, the OR of the other-system judgment data sent from the monitor unit of the other system via the communicating means and the own-system judgment data calculated at step S2 is calculated and specified as state judgment data. Since a normal state is defined as a logical 0 and an abnormal state is defined as a logical 1, if one or both of the own-system or other-system judgment data indicates, or indicate, the abnormal state, the integrated judgment data resulting from the OR calculation is a logical 1.

At step S4, the state judgment data is analyzed. If the integrated judgment data is a logical 1, it is judged that a malfunction has occurred. If the judgment data is a logical 0, it is judged that the power source unit is normal. At step S5, the result of the analysis of state judgment data is checked. If the result indicates that the power source unit is normal, control is passed to step S7. If the result indicates that the power source unit has malfunctioned, control is passed to step S6. At step S6, the power supply to the monitor units is cut off and the system is stopped.

When the power source unit 70 does not malfunction, state signals concerning the fans (single-fault occurrent notification signals or plural-fault occurrence notification signals) are read from the associated consolidating unit 40 and 41 at step S7. The AND of previous read data represented by a previous state signal and current read data is calculated at step S8. A signal expressing a continuous state is specified as own-system judgment data. Each of the state signals concerning fans sent from the consolidating units represents a logical 0 for normal operation or a logical 1 for abnormal operation. Similarly to monitoring of the power source unit 70 described in conjunction with step S2, state continuity can be judged on the basis of the AND data. When previous read data represents a logical 1 and current read data represents a logical 1, the AND of the data is a logical 1. This means that an abnormal state is continuous. The AND data is then reflected on the own-system judgment data. The own-system judgment data is sent to the monitor unit of the other system via the communicating means.

At step S9, the OR of the other-system judgment data sent from the monitor unit of the other system via the communicating means and the own-system judgment data calculated at step S8 is calculated and specified as state judgment data concerning the fans. Since a normal state is defined as a logical 0 and an abnormal state is defined as a logical 1, the OR calculation provides integrated data. In this example, monitor data represented by single-fault occurrence notification signals S-ALMxx and monitor data represented by plural-fault occurrence notification signals D-ALMxx are integrated separately.

At step S10, the state judgment data is analyzed. At step S11, it is judged on the basis of the result of analysis of state judgment data if one fault occurs. If occurrence of one fault is detected, the normal fans that are not failing are controlled and rotated at high speed at step S12. Thereafter, control is returned to step S1. Monitoring is continued.

If it is judged at step S11 that occurrence of one (i.e., a single) fault is not detected, it is judged at step S13 if two or more faults occur. If two or more faults occur, supply of a sufficient amount of cooling air cannot be guaranteed. At step S14, power supply to the monitor units is cut off and the system is stopped. If the result of judgment made at step S13 is negative, control is returned to step S1. Monitoring is continued.

In the aforesaid embodiment, data consolidation results in representations of occurrences of a single fault and of a plurality of faults. The form of data consolidation is not limited to this one. Alternatively, as will be apparent to a person of ordinary skill in the art, data consolidation may result in representations of occurrences of n faults and of m faults (where n denotes an integer of 1 or larger and m denotes an integer of 2 or larger). The representations are then fed to the monitor units 10 and 11.

In the aforesaid embodiment, each consolidating unit sends two kinds of fault occurrence notification signals to each monitor unit. The form of notification is not limited to this one. Alternatively, as will be apparent to a person of ordinary skill in the art, an increased number of kinds of signals, that result from the consolidation of notifications of a malfunction sent from objects of monitor, for example, three or more kinds of fault occurrence notification signals, may be fed to monitor units.

What is claimed is:

1. A state monitoring system, comprising:

a plurality of objects of the same kind monitored by the state monitoring system, each object outputting a monitor signal indicating a current state of the object as operative or malfunctioning;

a consolidating unit receiving the corresponding monitor signals output by said plurality of objects and consolidating the received monitor signals and producing notification signal outputs indicating corresponding states of operability or malfunctioning of an individual object and of said plurality of objects, a number of notification signal outputs being less than a number of the plurality of objects; and at least two monitors simultaneously and in parallel receiving the notification signal outputs of the consolidating unit and determining the current state of a plurality of states of the plurality of objects, the plurality of states of the plurality of objects being a smaller number than the plurality of objects.

2. The state monitoring system as set forth in claim 1, wherein:

said objects are divided into a plurality of groups of objects, each group comprising plural objects;

a respective said consolidating unit is provided for each group of objects of monitor; and each of said at least two monitors monitors an n-fault occurrence notification signal and an m-fault occurrence notification signal relating respectively to each group of objects of monitor and consolidated by said respective consolidating unit.

3. The state monitoring system as set forth in claim 2, wherein:

a plurality of said monitors is provided;

each of said plurality of monitors is connected to an associated one of said consolidating units; and each monitor includes a communicating unit transferring monitor data to or from another monitor.

4. The state monitoring system as set forth in claim 2, wherein each said monitor further includes a communicating unit transferring the respective monitor data thereof to, or receiving respective monitor data from, another monitor at given intervals and judging the states of associated objects on the basis of the respective monitor data thereof and the respective monitor data received therein from the another monitor.

5. A state monitoring system, comprising:

a plurality of objects of the same kind monitored by the state monitoring system, each object outputting a respective monitor signal indicating a current state of the object as operative or malfunctioning;

at least two monitors;

a consolidating unit receiving the respective monitor signal outputs of said plurality of objects and consolidating same and producing corresponding notification signal outputs respectively indicating operative or malfunctioning states of an individual object and of said plurality of objects, a number of notification signal outputs being less than a number of the plurality of objects, said consolidating unit, when receiving notifications of malfunctions from n (where n denotes an integer of 1 or larger) objects among said plurality of objects, notifying said at least two monitors of an occurrence of n faults, using an n fault occurrence notification signal, and, when receiving notifications of a malfunction from m (where m denotes an integer of 2 or larger) or more objects among said plurality of objects, notifying said at least two monitors of an occurrence of m faults, using an m fault occurrence notification signal; and said at least two monitors simultaneously and in parallel receiving the notification signal outputs of the consolidating unit and determining the current state of a plurality of states of the plurality of objects, the plurality of states of the plurality of objects being a smaller number than the plurality of objects.

6. The state monitoring system as set forth in claim 5, wherein:

said objects are divided into a plurality of groups of objects, each group comprising plural objects;

a respective said consolidating unit is provided for each group; and each of said at least two monitors monitors said n fault occurrence notification signals and said m fault occurrence notification signals that relate to each group of objects and that are consolidated by said respective consolidating unit.

7. The state monitoring system as set forth in claim 6, wherein:

each of said at least two monitors is connected to each of said consolidating units; and each monitor includes a communicating unit transferring respective monitor data thereof to another monitor or receiving from another monitor respective monitor data thereof.

8. The state monitoring system as set forth in claim 5, wherein said each monitor further includes a communicating unit transferring the respective monitor data thereof to another monitor or receiving from another monitor respective monitor data thereof at given intervals and judging the states of associated objects on the basis of the respective monitor data thereof and the respective monitor data received therein from the another monitor.

9. A state monitoring system, comprising:

plural monitored objects, of a common type and arranged in respective, separately identified groups, each group comprising a first, common number of plural, respectively associated objects, each object producing a corresponding monitor signal output indicating a monitored state of the object;

logic circuits receiving and processing the corresponding monitor signal outputs of the plural monitored objects and producing, for each separately identified group of objects, a corresponding set of a second number of logic processed output signals indicating respective, monitored states of the plural objects of the respective group, the second number being less than the first number; and first and second monitors, each redundant of the other, commonly receiving the respective logic processed output signals for the separately identified groups of objects and judging the corresponding states of the respective groups of objects, each monitor monitoring its own state and each monitor further comprising a communications unit communicating the respective monitored state thereof to the other monitor and receiving from the other monitor the respective monitored state thereof.

10. A state monitoring system as recited in claim 9, wherein each monitored object comprises an electric power consuming device, further comprising:

a power source unit selectively operable for supplying power individually to each of the plural power consuming devices;

the plural power consuming devices producing corresponding monitor signal outputs representing continued operability or inoperability of the corresponding, plural power consuming devices;

each set of the second number of logic processed output signals produced by the logic representing states of operability or inoperability of the corresponding group of plural, respectively associated objects in accordance with (a) a first condition of all of the associated objects of the group being operable, (b) a second condition of a sufficient number of the associated objects of the group thereof being operable to satisfy operability of the group thereof and (c) a third condition of an insufficient number of the associated objects of the group being operable and defining an inoperable condition of the group thereof; and the first and second monitors maintaining the supply of power to each group of plural objects for the first and second conditions and terminating the supply of power to the groups for the third condition.

11. A state monitoring system as recited in claim 9, wherein each of the first and second monitors is responsive to the determination of operability of the other monitor so as to recognize an inoperative state of the other monitor in the event of an inconsistent determination.

\* \* \* \* \*

UNITED STATES PATENT AND TRADEMARK OFFICE
CERTIFICATE OF CORRECTION

PATENT NO.: 5,966,511
DATED : October 12, 1999
INVENTOR(S): Shoji TEMMA

It is certified that error appears in the above-identified patent and that said Letters Patent is hereby corrected as shown below:

Col. 10, line 27, after "logic" insert --circuit--.

Signed and Sealed this

Thirteenth Day of June, 2000

Attest:

Q. TODD DICKINSON

*Attesting Officer*  *Director of Patents and Trademarks*